United States Patent
Harwath et al.

(10) Patent No.: US 9,507,097 B2
(45) Date of Patent: Nov. 29, 2016

(54) SEALING UNIT FOR FIBER OPTIC INTERCONNECTIONS

(71) Applicant: CommScope Technologies LLC, Hickory, NC (US)

(72) Inventors: Frank A. Harwath, Naperville, IL (US); Ronald A. Vaccaro, Shorewood, IL (US); Henry Villegas, Frankfort, IL (US); Gregory Just, La Grange Park, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/826,623

(22) Filed: Aug. 14, 2015

(65) Prior Publication Data

US 2016/0062045 A1    Mar. 3, 2016

Related U.S. Application Data

(60) Provisional application No. 62/041,934, filed on Aug. 26, 2014.

(51) Int. Cl.
*G02B 6/38* (2006.01)
*G02B 6/44* (2006.01)

(52) U.S. Cl.
CPC ............. *G02B 6/387* (2013.01); *G02B 6/3887* (2013.01); *G02B 6/3893* (2013.01); *G02B 6/4494* (2013.01)

(58) Field of Classification Search
CPC .................................................... G02B 6/387
See application file for complete search history.

(56) References Cited

U.S. PATENT DOCUMENTS

| | | | |
|---|---|---|---|
| 5,064,268 A | 11/1991 | Morency et al. | |
| 6,429,373 B1 | 8/2002 | Scrimpshire et al. | |
| 6,856,748 B1 | 2/2005 | Elkins, II et al. | |
| 7,628,545 B2 | 12/2009 | Cody et al. | |
| 8,388,235 B1* | 3/2013 | Volker | G02B 6/3816 385/52 |
| 8,764,480 B2 | 7/2014 | Natoli et al. | |
| 8,814,441 B2* | 8/2014 | Strasser | G02B 6/3893 385/56 |
| 2010/0111477 A1* | 5/2010 | Strasser | G02B 6/3893 385/56 |
| 2012/0063723 A1* | 3/2012 | Jenkins | G02B 6/3816 385/78 |
| 2014/0097022 A1 | 4/2014 | Vaccaro | |
| 2015/0017827 A1 | 1/2015 | Vaccaro | |
| 2015/0136439 A1 | 5/2015 | Vaccaro | |
| 2015/0212284 A1* | 7/2015 | Lichoulas | G02B 6/3825 385/56 |
| 2015/0219857 A1 | 8/2015 | Lichoulas et al. | |
| 2016/0062045 A1* | 3/2016 | Harwath | G02B 6/387 385/56 |

OTHER PUBLICATIONS

International Search Report and Written Opinion for corresponding PCT Application No. PCT/US2015/046698, date of mailing Nov. 27, 2015, 14 pages.

* cited by examiner

*Primary Examiner* — Rhonda Peace
(74) *Attorney, Agent, or Firm* — Myers Bigel, P.A.

(57) ABSTRACT

A weatherproofed interconnection junction includes: a first cable having a first connector at one end; a second connector; a sealing cylinder with an internal cavity, wherein the first connector and second connector are joined and reside within the cavity; and an elastomeric sealing boot having a cable section and a connector section. The first cable is conformably received in the cable section and the sealing cylinder is conformably received in the connector section.

13 Claims, 5 Drawing Sheets

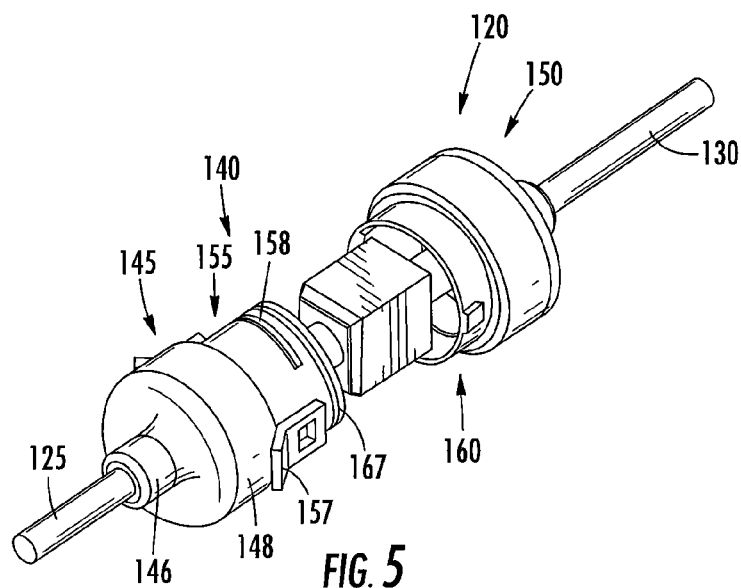
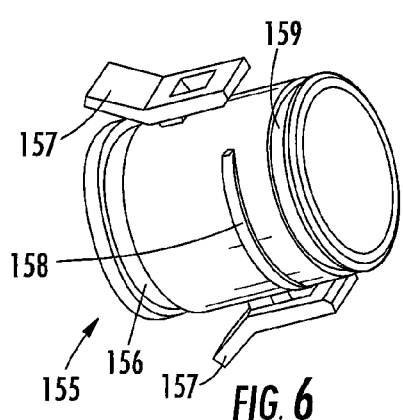
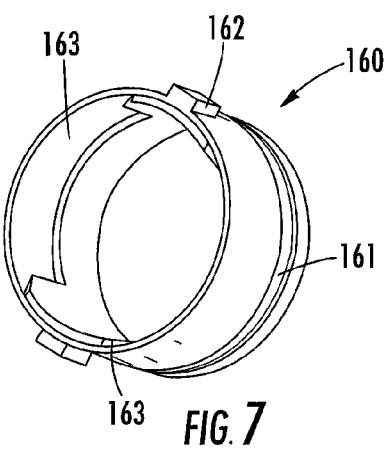
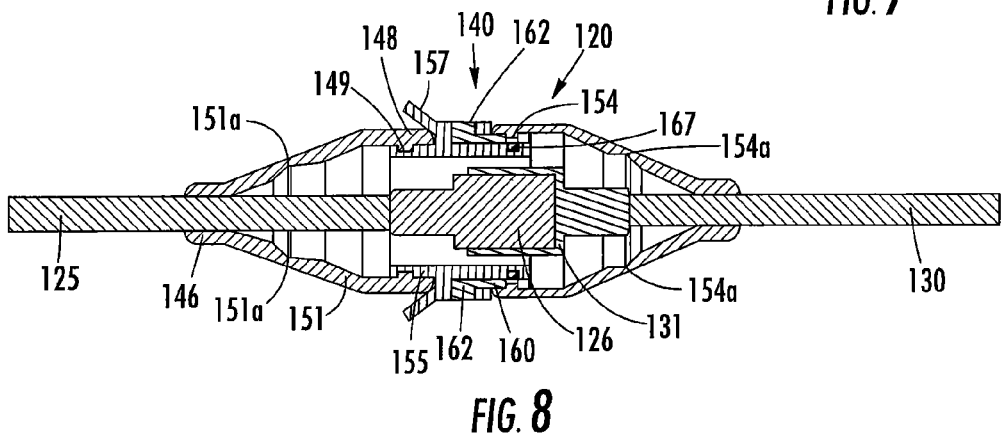

SEALING UNIT FOR FIBER OPTIC INTERCONNECTIONS

RELATED APPLICATION

The present invention claims priority from and the benefit of U.S. Provisional Patent Application No. 62/041,934, filed Aug. 26, 2014, the disclosure of which is hereby incorporated herein in its entirety.

FIELD OF THE INVENTION

The invention relates generally to a device for environmentally sealing and securing the interconnection between communications cables and/or communications cables and electronic equipment.

BACKGROUND

Interconnection junctions, such as the interconnection between two cables or a cable and a piece of electronic equipment, may be subject to mechanical degradation from environmental factors such as moisture, vibration and repeated expansion and contraction from daily temperature changes. As an example, a fiber optic cable assembly might be terminated with a dual LC connector (DLC) where the end customer might desire SC terminations. A cable assembly configured to provide a DLC interface on one end and SC on the other would provide the interface desired. Unfortunately, LC connectors are not weatherproof, and if exposed to harsh conditions will not perform at an optimal level for any significant time period. Therefore, it is desirable that the connection be isolated from moisture, ice, dust, oil, and other contaminants which could cause premature failure.

Outer sealing enclosures that surround or enclose a cable interconnection have been used to protect such interconnections. Enclosures often apply rigid clamshell configurations that, once closed, may be difficult to open, especially when installed in exposed or remote locations, such as atop radio towers; gaskets or gel seals may be applied at the enclosure ends and/or along a sealing perimeter of the shell.

Elastic interconnection seals are also known. Elastic seals can be advantageous by virtue of being more easily installed over the typically uneven contours of a cable or cable/equipment interconnection. Exemplary configurations are described in U.S. Pat. No. 6,429,373 and in U.S. patent application Ser. No. 13/646,952, filed Oct. 8, 2012; Ser. No. 13/938,475, filed Jul. 10, 2013; and Ser. No. 14/245,443, filed Apr. 4, 2014, the disclosures of each of which are hereby incorporated by reference herein.

The continued development of additional configurations and varieties of connectors can necessitate additional sealing configurations and techniques.

SUMMARY

As a first aspect, embodiments of the invention are directed to a weatherproofed interconnection junction. The interconnection junction comprises: a first cable having a first connector at one end; a second connector; a sealing cylinder with an internal cavity, wherein the first connector and second connector are joined and reside within the cavity; and an elastomeric sealing boot having a cable section and a connector section. The first cable is conformably received in the cable section and the sealing cylinder is conformably received in the connector section.

As a second aspect, embodiments of the invention are directed to a weatherproofed interconnection junction, comprising: a first cable having a first connector at one end; a second connector having a second connector at one end; a sealing cylinder with an internal cavity, wherein the first connector and second connector are joined and reside within the cavity; a first elastomeric sealing boot having a cable section and a connector section, wherein the first cable is conformably received in the cable section and the sealing cylinder is conformably received in the connector section; and a second elastomeric sealing boot having a cable section and a connector section, wherein the second cable is conformably received in the cable section.

As a third aspect, embodiments of the invention are directed to a weatherproofed interconnection junction, comprising: a first cable having a first connector at one end; a second connector mounted on a mounting structure, the mounting structure including a receptacle; a sealing cylinder with an internal cavity, wherein the first connector and second connector are joined and reside within the cavity, the sealing cylinder sealingly engaging the receptacle; and an elastomeric sealing boot having a cable section and a connector section. The first cable is conformably received in the cable section and the sealing cylinder is conformably received in the connector section.

As a fourth aspect, embodiments of the invention are directed to a sealing boot for an interconnection junction, comprising: an annular cable section having a first diameter; an annular connector section having a second diameter that is greater than the first diameter; and a transition section that extends between the cable section and the connector section. The transition section is configured to enable the transition section to fold upon itself to move the connector section to a retracted position in which the connector section is adjacent the cable section. The sealing boot comprises an elastomeric material.

BRIEF DESCRIPTION OF THE FIGURES

FIG. 5 is a perspective view of a cable-connector assembly according to additional embodiments of the invention, with the bistable sealing boots being retracted.

FIG. 6 is a perspective view of one of the sealing cylinders of the assembly of FIG. 5.

FIG. 7 is a perspective view of the other of the sealing cylinders of the assembly of FIG. 5.

FIG. 8 is a cross-sectional view of the assembly of FIG. 5, with the sealing boots in their unfolded positions.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used herein is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
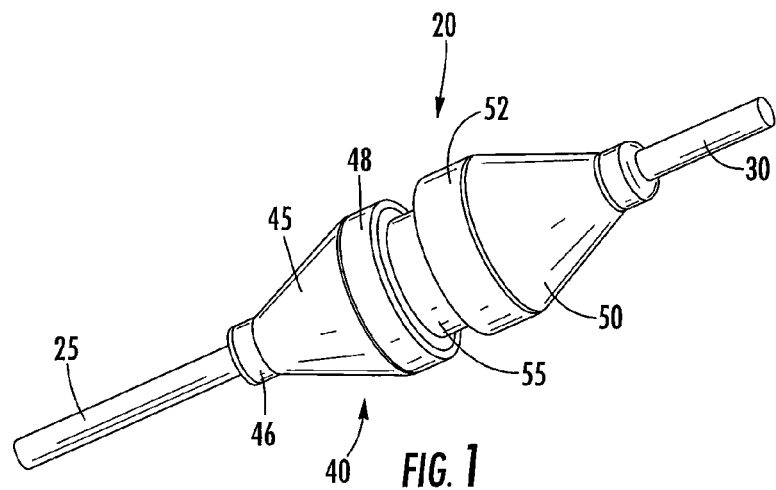
FIG. 1 is a perspective view of a cable-connector assembly according to embodiments of the invention, the assembly being shown in a mated condition.
Figure 4:
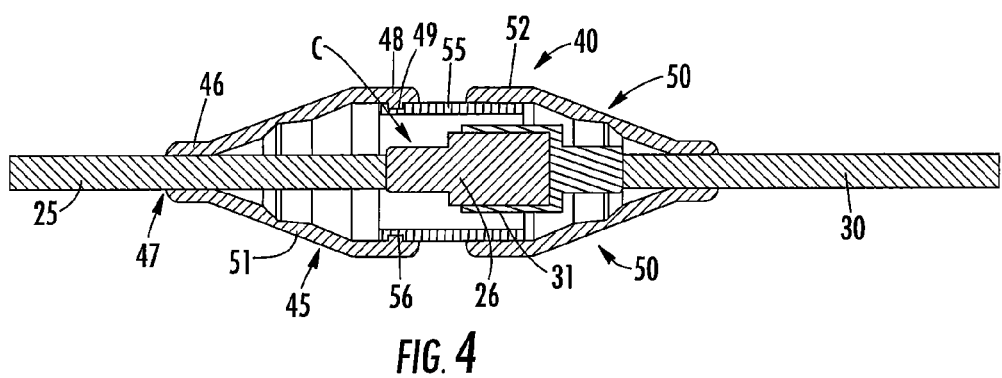
FIG. 4 is a cross-sectional view of the cable-connector assembly of FIG. 1.

Referring now to the drawings, an assembly 20 is shown in FIGS. 1 and 4. The assembly 20 includes two fiber optic cables 25, 30, each of which is terminated with a respective connector 26, 31 that mate with each other (see FIG. 4). The assembly also includes a weatherproofing unit 40 comprising two sealing boots 45, 50 and a sealing cylinder 55. These components are described in detail below.

Figure 3:
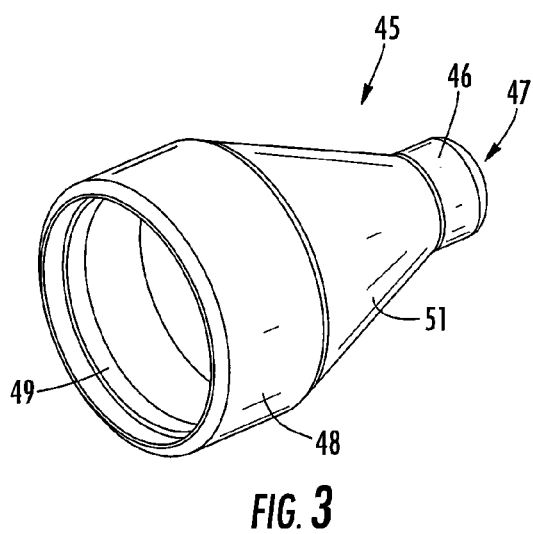
FIG. 3 is a perspective view of the one of the sealing boots of the assembly of FIG. 1.

Referring to FIGS. 1, 3 and 4, the sealing boot 45 is generally conical and includes a cable section 46 with a bore 47 that is sized to fit over the cable 25. At the opposite end, the sealing boot 45 includes an open-ended connector section 48 that is larger in diameter than the cable section. The connector section 48 has a radially-inwardly extending ridge 49. The cable section 46 and the connector section 48 each merge with a transition section 51. Referring to FIGS. 1 and 4, the sealing boot 50 is similar to the sealing boot 45, with the exception that it lacks a ridge in its connector section 52.

Typically, the sealing boots 45, 50 are formed of a polymeric material. As used herein, a "polymeric" material includes elastomeric materials, such as rubbers, as well as harder polymeric materials. An exemplary rubber material may be selected from the group consisting of silicone, fluorosilicone, EPDM, and nitrile rubbers.

Figure 2:
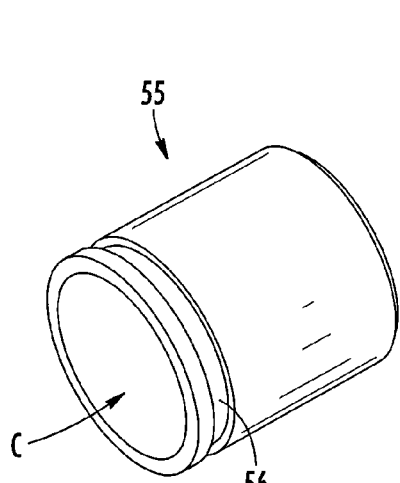
FIG. 2 is a perspective view of the sealing cylinder of the assembly of FIG. 1.

Referring now to FIGS. 1, 2 and 4, the sealing cylinder 55 is generally cylindrical and includes an internal cavity C. The sealing cylinder 55 also includes an external groove 56 that is sized to receive the ridge 49 of the sealing boot 45. The sealing cylinder 55 is typically formed of a hard plastic, such as polypropylene or acrylonitrile-butadiene-styrene (ABS).

In the illustrated embodiment, the end of the sealing cylinder 55 nearest the groove 56 is slipped into the connector section 48 of the sealing boot 45 until the ridge 49 fits within the groove 56, with the sealing cylinder 55 conformably received by the connector section 48. The sealing cylinder 55 is adhered to the connector section 48 of the sealing boot 45 via an adhesive; in other embodiments, the sealing cylinder 55 may be attached to the sealing boot 45 by other means, or may be formed as a separate piece that slips inside the sealing boot 45.

Referring now to FIGS. 1 and 4, the assembly 20 is formed by slipping the sealing boots 45, 50 onto respective cables 25, 30, with the cable section of each snugly fitting over its cable 45, 50 to form a seal. The sealing cylinder 55, conformably attached to the sealing boot 45, is positioned over the connector 26. The connectors 26, 31 are mated in conventional fashion. The end of the sealing cylinder 55 opposite the sealing boot 45 is then conformably received by the connector section 52 of the sealing boot 50. In this configuration, the weatherproofing unit 40 can provide a watertight enclosure to the mating connectors 26, 31, which reside in the cavity C of the sealing cylinder 55.

An alternative embodiment of an assembly is shown in FIGS. 5-8 and designated broadly at 120. The assembly 120 includes two fiber optic cables 125, 130, each of which is terminated with a respective connector 126, 131 that mate with each other as described above. A weatherproofing unit 140 includes two sealing boots 145, 150 of the configuration described above. However, the weatherproofing unit 140 also includes two sealing cylinders 155, 160 that are configured to sealingly engage each other. These are described in greater detail below.

Referring now to FIGS. 5, 6 and 8, the sealing cylinder 155 is similar to the sealing cylinder 55 described above, with a groove 156 located near one end. However, the sealing cylinder 155 also includes a pair of latches 157 on opposite sides of the cylinder 155, and further includes diametrically opposed alignment ridges 158 positioned between the latches 157. An O-ring groove 159 is present at the end of the sealing cylinder 155 opposite the groove 156.

Referring now to FIGS. 5, 7 and 8, the sealing cylinder 160 is slightly larger in diameter than the sealing cylinder 155. The sealing cylinder 160 has a groove 161 at one end. At the opposite end, the sealing cylinder 160 includes two diametrically opposed lugs 162 that extend radially outwardly. Two alignment recesses 163 are located on the inner surface of the sealing cylinder 160.

Referring to FIGS. 5 and 8, interconnection of the assembly 120 begins with the placement of the sealing boots 145, 150 on the cables 125, 130. The sealing cylinders 155, 160 are then positioned in the sealing boots 145, 150, with the ridges 149, 154 of the sealing boots 145, 150 being inserted into respective grooves 156, 161. The sealing cylinders 155, 160 are then assembled, with the sealing cylinder 160 fitting over the sealing cylinder 155. The alignment ridges 158 of the sealing cylinder 155 nest within the recesses 163 of the sealing cylinder 160 to aid with alignment of the sealing cylinders 155, 160, so that the latches 157 of the sealing cylinder 155 engage the lugs 162 of the sealing cylinder 160 to hold them together. An O-ring 167 is included in the groove 159 of the sealing cylinder 155 to provide a moisture seal between the two sealing cylinders 155, 160. Thus, the sealing boots 145, 150 and the sealing cylinders 155, 160 create the weatherproofing unit 140 that provides the connectors 126, 131 with a watertight enclosure.

It can also be seen from FIG. 5 that the sealing boots 145, 150 are "bistable," meaning that they can take a second, retracted configuration for ease of assembly. As shown in FIG. 8, the transition section 151 of the sealing boot 145 includes an annular recessed area 151a on its inner surface (this can also be seen in FIG. 4 in the sealing boot 45). The recess 151a enables the transition section 151 to fold on itself so that the connector section 148 can retract to a rearward position near the cable section 146. The sealing boot 145 is stable in this position, which can facilitate assembly of the connectors 126, 131. The sealing cylinder 155 can then be moved to and into engagement with the sealing cylinder 160 by returning the sealing boot 155 to its original, unfolded configuration. FIG. 8 also shows that the sealing boot 150 has a similar recess 154a in its transition section 154 that allows the sealing boot 150 to fold onto itself to facilitate assembly.

Figure 9:
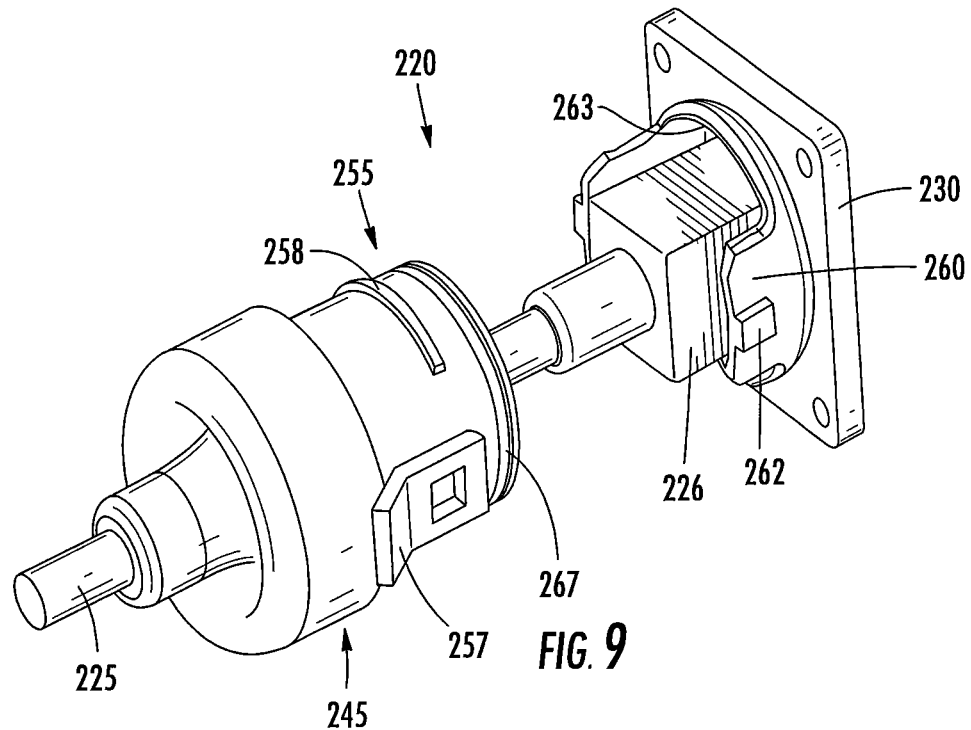
FIG. 9 is a perspective view of a cable-connector assembly according to further embodiments of the invention, with the sealing boot shown in its retracted position.
Figure 10:
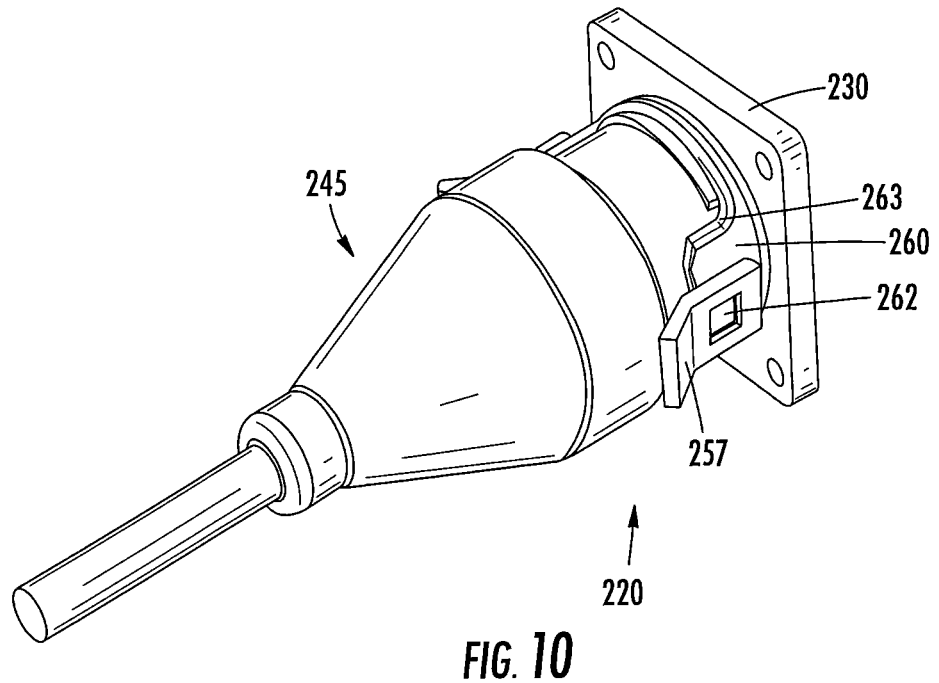
FIG. 10 is a perspective view of the assembly of FIG. 9, with the sealing boot shown in its unfolded position.

FIGS. 9 and 10 illustrate another assembly, designated at 220, according to embodiments of the invention. The assembly 220 includes a cable 225, a sealing boot 245, and a sealing cylinder 255 as described above. However, the cable 225 is mated to a connector (not shown) mounted to a structure 230, such as a flange, bulkhead or panel. The structure 230 includes a mounting receptacle 260 with lugs 262 for engaging the latches 257 of the sealing cylinder 255, and further includes recesses 263 that receive the alignment ridges 258 of the sealing cylinder 255.

As can be seen in FIG. 9, the sealing boot 245 is inserted onto the cable 225, the sealing cylinder 255 is inserted into the sealing boot 245, and the sealing boot 245 is retracted to its folded position. The connector 226 is connected with the connector (not shown) of the structure 230, and the sealing boot 245 is extended to its unfolded position (FIG. 10) to enable the latches 257 of the sealing cylinder 255 to engage the lugs 262 of the mounting receptacle 260 as the sealing cylinder 255 slips within the receptacle 260. The o-ring 267 provides a seal between the sealing cylinder 255 and the receptacle 260.

The weatherproofing units can protect fiber optic connectors that typically do not have cylindrical sealing surfaces as part of the connectors like those typically found on RF connectors. Nonetheless, it should be noted that this sealing system may be suitable for use with other connectors, such as coaxial and/or power connectors, often employed alongside fiber optic connectors in wireless installations.

Figure 11:
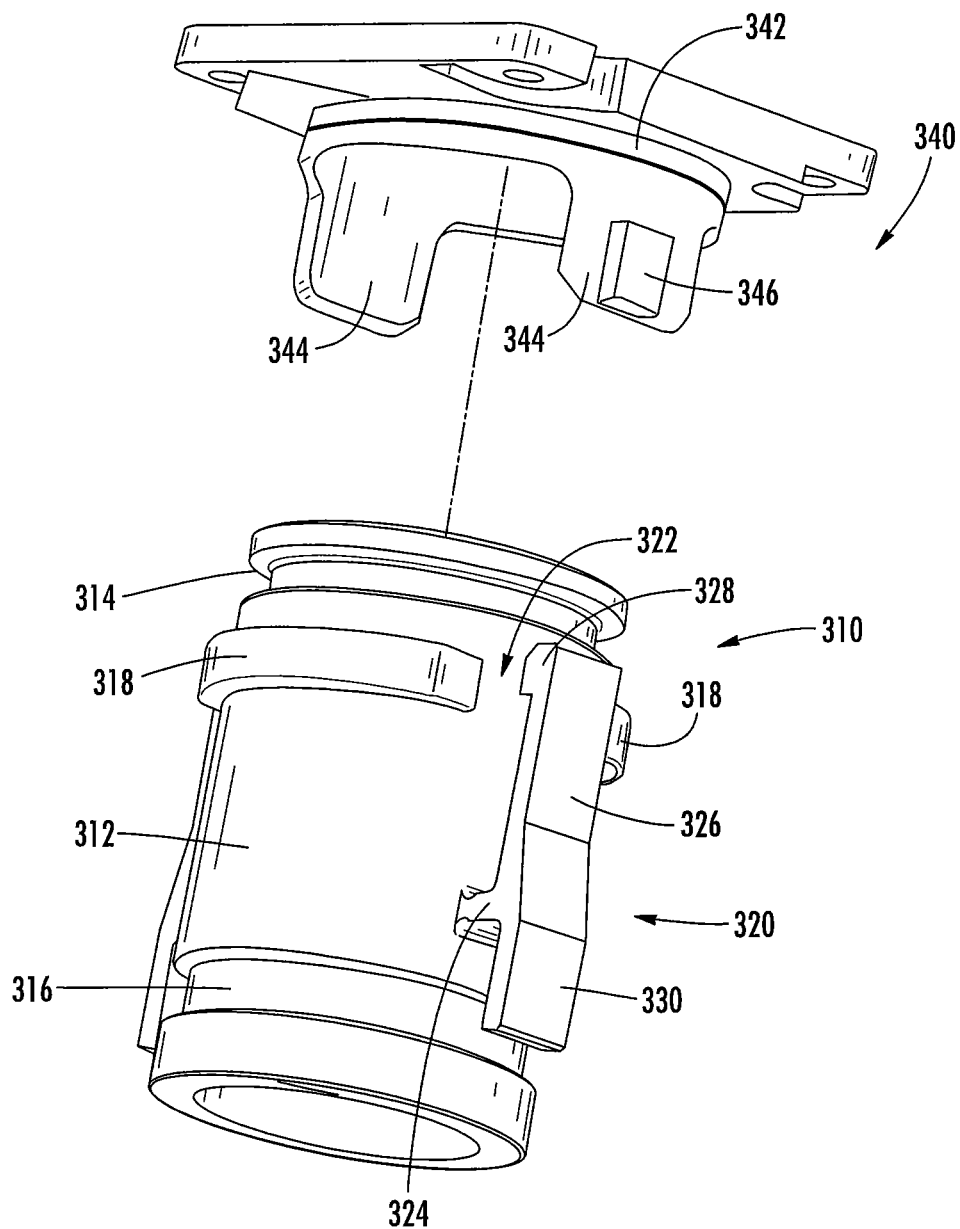
FIG. 11 is an exploded perspective view of a protective sleeve adapted to attach to a shroud of a bulkhead of a RRU according to alternative embodiments of the invention.

A further embodiment of a sealing cylinder for protecting an interface between optical fibers of a fiber optic cable and a RRU is illustrated in FIG. 11 and designated broadly at 310. The sealing cylinder 310 has a generally cylindrical body 312. A groove 314 is present near one end of the body 312. Another groove 316 is located adjacent the opposite end of the body 312. A pair of diametrically opposed ridges 318 are positioned near the groove 314; the ridges 318 each extend approximately 120 degrees about the circumference of the body 312, such that gaps 322 are formed.

Two latches 320 are mounted in diametrically opposed locations on the body 322. Each latch 320 includes a stem 324 that extends radially outwardly from the body 312, an arm 326 that extends from the stem 324 toward the groove 314 and that has a hook 328 at its free end, and a tab 330 that extends from the stem 324 toward the groove 316. Like the sealing cylinders 55, 155, 160, the sealing cylinder 310 can be formed of a variety of materials.

FIG. 11 also illustrates a mounting receptacle 340 for mounting on a RRU or other structure (not shown) that is similar to the mounting receptacle 260 described above. The mounting receptacle 340 includes a circular rim 342 from which two fingers 344 extend. Each of the fingers 344 has a lug 346 on its outer surface. The rim 342 and fingers 344 are mounted on a base 348 that is in turn mounted on a RRU.

To assemble the sealing cylinder 310 with the fitting 340, an O-ring (not shown) is positioned in the groove 314. A technician grasps the tabs 330 of both latches 320 (typically with one hand) and presses the tabs 330 toward each other (i.e., radially inwardly). This action causes the arms 326 of each latch to pivot away from the base 312 (i.e., radially outwardly). The sealing cylinder 310 is then advanced toward the mounting receptacle 340 with the latches 320 in this deflected condition. The sealing cylinder 310 is rotated about its longitudinal axis until the gaps 322 between the ridges 318 align with the fingers 344 of the mounting receptacle 340. The end of the body 312 and the groove 314 (with the O-ring in place) then slide between the fingers 344 and within the rim 342 until the ridges 318 of the sleeve 310 engage the edge of the rim 342. In this position, the hooks 328 of the latches 320 are positioned just beyond the lugs 346 of the fingers 344. The latches 320 can then be released by the technician, which enables the hooks 328 to engage the lugs 346, thereby securing the sealing cylinder 310 to the mounting receptable 340 (see FIG. 12).

At the opposite end of the sealing cylinder 310, a protective cover like the sealing boots 145, 155 described above can be attached. As described above, such a cover is typically resilient and has a lip that fits within the groove 316, thereby forming a seal. At the opposite end, the cover seals with a furcation tube of one or more optical fibers. Other exemplary covers are shown in U.S. Provisional Patent Application Ser. No. 62/017,802, filed Jun. 26, 2014, the disclosure of which is hereby incorporated herein in its entirety.

Figure 12:
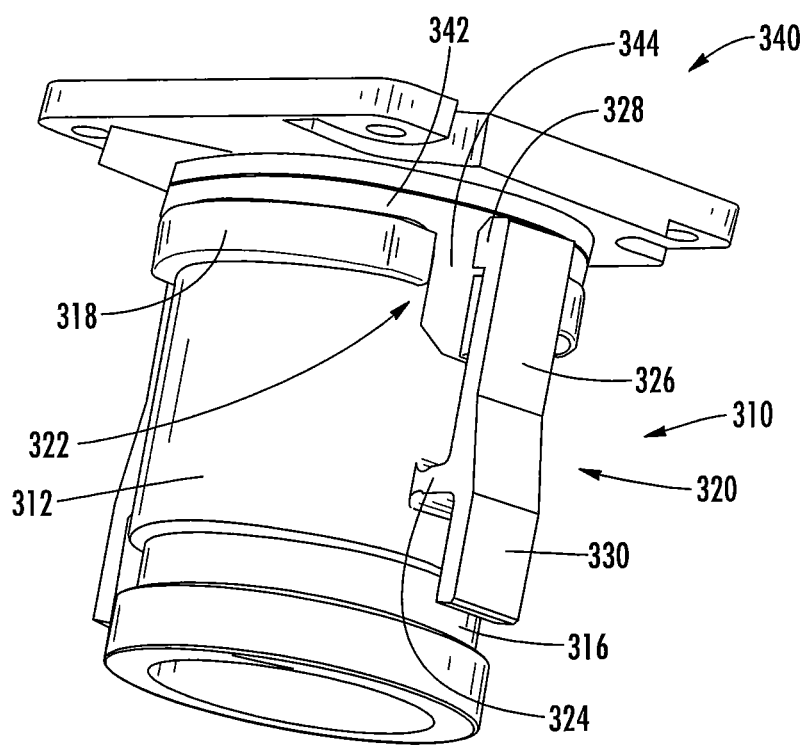
FIG. 12 is an assembled perspective view of the sleeve and shroud of FIG. 11.

As can be discerned by examination of FIGS. 11 and 12, the sealing cylinder 310 can be secured relatively easily with the mounting receptacle 340, and can be so secured using only one hand. The resulting connection provides a weather-sealed environment for the interface between the optical fibers that form an interface with the RRU or other structure.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A weatherproofed interconnection junction, comprising:
   a first cable having a first connector at one end;
   a second cable having a second connector at one end;
   a first sealing cylinder with an internal cavity, wherein the first connector and second connector are joined and reside within the cavity;
   a first elastomeric sealing boot having a cable section and a connector section, wherein the first cable is conformably received in the cable section and the sealing cylinder is conformably received in the connector section;
   a second elastomeric sealing boot having a cable section and a connector section, wherein the second cable is conformably received in the cable section; and
   a second sealing cylinder, wherein the first sealing cylinder sealingly engages the second sealing cylinder, and wherein the second sealing boot conformably receives the second sealing cylinder;
   wherein the first sealing cylinder comprises attachment features to attach the first sealing cylinder to the second sealing cylinder, and the first sealing cylinder comprises alignment features to orient the first sealing cylinder relative to the second sealing cylinder.

2. The interconnection junction defined in claim 1, wherein the second sealing boot conformably receives the sealing cylinder.

3. The interconnection junction defined in claim 2, wherein the second sealing boot is adhered to the second sealing cylinder.

4. The interconnection junction defined in claim 1, wherein the first and second connectors are fiber optic connectors.

5. A weatherproofed interconnection junction, comprising:
- a first cable having a first connector at one end;
- a second connector mounted on a mounting structure, the mounting structure including a receptacle;
- a sealing cylinder with an internal cavity, wherein the first connector and second connector are joined and reside within the cavity, the sealing cylinder sealingly engaging the receptacle; and
- an elastomeric sealing boot having a cable section and a connector section, wherein the first cable is conformably received in the cable section and the sealing cylinder is conformably received in the connector section;
- wherein the sealing cylinder comprises attachment features to attach the sealing cylinder to the receptacle; and wherein the attachment features comprises two latches configured to engage the receptacle.

6. The interconnection junction defined in claim 5, wherein the latches are mounted on opposite sides of the sealing cylinder to enable a technician to grasp both latches simultaneously to facilitate engagement of the latches with the receptacle.

7. The interconnection junction defined in claim 5, wherein the sealing cylinder comprises alignment features to orient the sealing cylinder relative to the receptacle.

8. The interconnection junction defined in claim 7, wherein the alignment features comprise discontinuous circumferential ridges.

9. The interconnection junction defined in claim 5, wherein the first and second connectors are fiber optic connectors.

10. A sealing boot for an interconnection junction, comprising:
- an annular cable section having a first diameter;
- an annular connector section having a second diameter that is greater than the first diameter; and
- a transition section that extends between the cable section and the connector section;
- wherein the transition section is configured to enable the transition section to fold upon itself to move the connector section to a retracted position in which the connector section is adjacent the cable section;
- wherein the sealing boot comprises an elastomeric material.

11. The sealing boot defined in claim 10, wherein the transition section has an annular recess on an inner surface thereof.

12. The sealing boot defined in claim 10, in combination with a sealing cylinder attached to the connector section.

13. The sealing boot defined in claim 10, in combination with a cable inserted into the cable section.

* * * * *